United States Patent
Yukawa et al.

(10) Patent No.: US 7,347,239 B2
(45) Date of Patent: Mar. 25, 2008

(54) TIRE NOISE REDUCING SYSTEM

(75) Inventors: Naoki Yukawa, Kobe (JP); Tadao Matsumoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 71 days.

(21) Appl. No.: 10/967,160

(22) Filed: Oct. 19, 2004

(65) Prior Publication Data

US 2005/0161138 A1    Jul. 28, 2005

(30) Foreign Application Priority Data

Jan. 27, 2004  (JP) .............. 2004-018761

(51) Int. Cl.
*B60C 9/22* (2006.01)
*B60C 11/03* (2006.01)
*B60C 5/14* (2006.01)
*B60C 5/00* (2006.01)
*B60C 19/00* (2006.01)

(52) U.S. Cl. ............. 152/209.18; 152/450; 152/510; 152/526; 152/527; 152/531; 152/533; 152/541

(58) Field of Classification Search ............. 152/450, 152/531, 533, 526, 527, 541, 209.18, 510, 152/523
See application file for complete search history.

(56) References Cited

U.S. PATENT DOCUMENTS

| 4,082,490 | A | | 4/1978 | Chateau |
| 4,140,168 | A | * | 2/1979 | Caretta ................. 152/527 |
| 4,299,264 | A | * | 11/1981 | Williams |
| 4,349,061 | A | * | 9/1982 | Hirakawa et al. ....... 152/541 X |
| 5,135,038 | A | * | 8/1992 | Graas et al. .......... 152/209.18 |
| 5,482,099 | A | * | 1/1996 | Kajiwara et al. ...... 152/526 X |
| 5,538,060 | A | * | 7/1996 | van der Meer et al. |
| 5,851,323 | A | * | 12/1998 | Kaido et al. ............ 152/510 |
| 6,253,816 | B1 | * | 7/2001 | Ide ......................... 152/527 |
| 6,578,612 | B1 | * | 6/2003 | Matsumura ....... 152/209.18 X |
| 2003/0150538 | A1 | | 8/2003 | Ceretta |
| 2004/0089392 | A1 | * | 5/2004 | Yukawa et al. ......... 152/533 |

FOREIGN PATENT DOCUMENTS

| EP | 0 503 405 A1 | 9/1992 |
| EP | 1 184 207 A2 | 3/2002 |
| EP | 1 253 025 A2 | 10/2002 |
| EP | 1253025 A3 | 6/2003 |
| EP | 1184207 A3 | 8/2003 |
| FR | 1309782 B | 10/1962 |

(Continued)

*Primary Examiner*—Adrienne C. Johnstone
(74) *Attorney, Agent, or Firm*—Birch, Stewart, Kolasch & Birch, LLP

(57) ABSTRACT

A tire noise reducing system comprises a pneumatic tire with a hollow, a wheel rim on which the tire is mounted so that said hollow forms a closed cavity, and a noise damper disposed in the closed cavity, wherein the noise damper is formed by fixing a strip of a porous material to the tire or wheel rim, the noise damper has a volume in a range of from 0.4 to 20% of the volume of the cavity, the noise damper has a sectional shape substantially constant in the tire circumferential direction, and the pneumatic tire comprises a tread portion provided with tread grooves defining a tread pattern having a sea ratio of 20 to 35%.

6 Claims, 7 Drawing Sheets

FOREIGN PATENT DOCUMENTS

| | | |
|---|---|---|
| GB | 1219702 | 1/1971 |
| GB | 2013143 A | 8/1979 |
| JP | 2002-178712 A | 6/2002 |
| WO | WO-02/102610 A1 * | 12/2002 |
| WO | WO-03/051619 A1 * | 6/2003 |

* cited by examiner

TIRE NOISE REDUCING SYSTEM

This nonprovisional application claims priority under 35 U.S.C. § 119(a) on patent application Ser. No. 2004-018761 filed in JAPAN on Jan 27, 2004, which is herein incorporated by reference.

BACKGROUND OF THE INVENTION

1. Field of the Invention

The present invention relates to a tire noise reducing system, more particularly to a pneumatic tire suited for use in combination with a noise damper disposed in the tire cavity.

Noise generated from a tire rolling on a road surface is analyzed into many kinds of sound according to the causes and sources. For example, a resonance of air in the annular tire cavity causes so called road noise which sounds like "GHO" having a maximum power spectrum ranging from about 100 to 250 Hz.

2. Related Art

A noise damper made of a spongy material disposed in a tire cavity is well known in the tire art such a spongy material disposed in a tire cavity can damp the air resonance.

However, if the air resonance sound is effectively reduced, another kind of sound is relatively increased and becomes noise offensive to the ear specifically, so called pattern pitch noise around 200 Hz and so called "SHAH" sound over 1 kHz for which main cause is circumferentially repeated tread elements or grooves are increased on the whole.

OBJECTS AND BRIEF SUMMARY OF THE INVENTION

It is therefore, an object of the present invention to provide a tire noise reducing system, in which not only the air resonance noise but also another noise can be effectively reduced to improve overall tire noise.

According to the present invention, a noise reducing system comprises a pneumatic tire with a hollow, a wheel rim on which the tire is mounted so that the tire hollow forms a closed cavity, and a noise damper disposed in the closed cavity, wherein the noise damper is formed by fixing a strip of a porous material to the tire or wheel rim, the noise damper has a volume in a range of from 0.4 to 20% of the volume of the cavity, the noise damper has a sectional shape substantially constant in the tire circumferential direction, and the pneumatic tire comprises a tread portion provided with tread grooves defining a tread pattern having a sea ratio of 20 to 35%.

In this specification, the porous material means a lightweight low-density flexible material which has preferably a large hysteresis loss or internal friction specifically, spongy materials, cellular plastics, foamed synthetic resins, bonded-fiber material formed by loosely bonding fibers (incl. synthetic or animals' or plant fibers) and the like can be used. An open-cell type and a closed-cell type can be used, but an open-cell type is preferred.

The "sea ratio" is the ratio of the total grooved area to the overall tread area between the tread edges.

The tread edges means the axially outer most edges of the ground contacting region of the tire under the normally-inflated normally-loaded state.

Incidentally, the volume V1 of the cavity can be obtained by the following approximate expression (1):

$$V1 = A \times \{(Di-Dr)/2 + Dr\} \times pi$$

wherein

"A" is the cross sectional area of the cavity (which can be obtained by computed tomography scan for example), "Di" is the maximum diameter of the cavity, "Dr" is the wheel rim diameter, and "pi" is the circle ratio.

These parameters are measured under the normally-inflated unloaded state of the tire. Here, the normally-inflated unloaded state of the tire is such that the tire is mounted on the wheel rim and inflated to a normal or standard pressure but loaded with no tire load. The normally-inflated normally-loaded state is such that the tire is mounted on the wheel rim and inflated to the standard pressure and loaded with a normal or standard load.

Embodiments of the present invention will now be described in detail in conjunction with the accompanying drawings.

DESCRIPTION OF PREFERRED EMBODIMENTS

Figure 1:
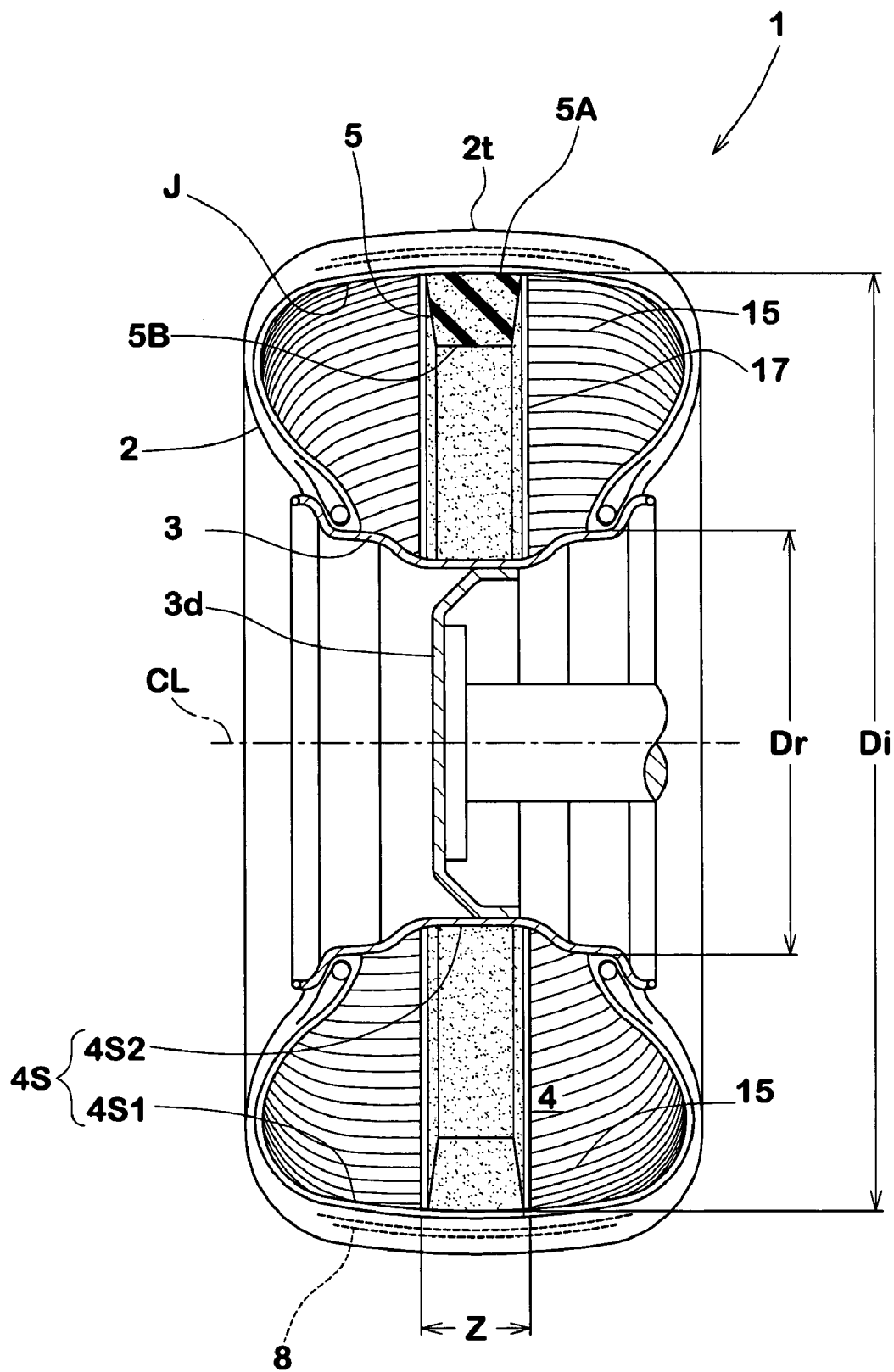
FIG. 1 is a cross sectional view of an assembly of a tire, wheel rim and noise damper according to the present invention.

According to the present invention, a noise damper 5 is disposed in a cavity 4 of an assembly of a pneumatic tire 2 and a wheel rim 3.

The pneumatic tire 2 has a tread portion 2t, a pair of sidewall portions 2s, and a pair of axially spaced bead portions 2b so as to have a toroidal shape and an annular tire hollow.

The wheel rim 3 comprises a pair of bead seats 3b for the tire beads 2b, a pair of flanges 3f extending radially outwardly from the bead seats 3b, and a rim well 3w between the bead seats 3b for tire mounting.

The wheel rim 3 and the tire 2 mounted thereon forms an annular cavity 4 as the tire hollow closed by the rim. Here, the cavity surface 4s is defined as the surface facing the cavity 4, namely, the inner surface 4s1 of the tire and the inner surface 4s2 of the wheel rim.

In this embodiment, the tire 2 is a radial tire for passenger cars. The wheel rim 3 may be a specially-designed rim, but in this embodiment, a standard wheel rim is used. Here, the standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are respectively defined as the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 200 kPa and 88% of the maximum tire load, respectively.

The wheel rim 3 in this example is fixed to a centersection 3d (spoke or disk) attached to the vehicle's axle and forms a two-piece wheel.

Figure 3:
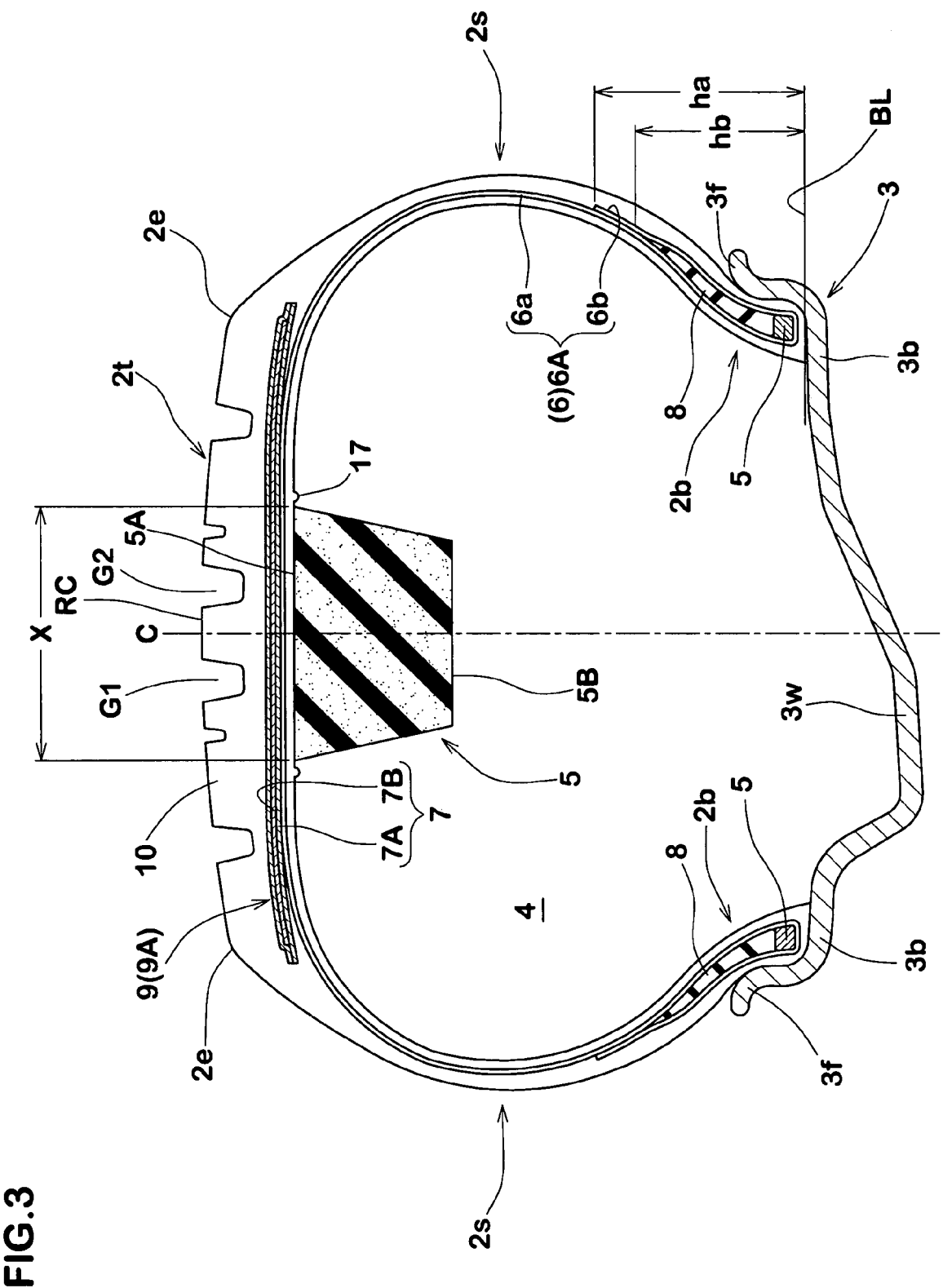
FIG. 3 is an enlarged cross sectional view of the tire and wheel rim.

As shown in FIG. 3, the tire 2 comprises: a bead core 5 disposed in each of the bead portions 2b; a carcass 6 extending between the bead portions 2b through the tread portion 2t and sidewall portions 2s; and a tread reinforcing belt 7, 9 disposed radially outside the carcass 6 in the tread portion 2t.

The carcass 6 comprises at least one ply 6A of organic fiber cords arranged radially at an angle of 90 to 70 degrees with respect to the tire equator, and extending between the bead portions 2b through the tread portion 2t and sidewall portions 2s, and turned up around the bead core 5 in each bead portion 2b from the inside to the outside of the tire so as to form a pair of turned up portions 6b and a main portion a therebetween.

Between the main portion 6a and turned up portion 6b in each bead portion 2b, a bead apex 8 is disposed. The bead apex 8 is made of a relatively hard rubber having a hardness of not less than 80 degrees, preferably not less than 85 degrees, but not more than 98 degrees, preferably not more than 94 degrees.

In this specification, the hardness of rubber means the JIS-A hardness measured with a type-A durometer according to Japanese Industrial Standard K6253.

The bead apex 8 extends radially outwardly from the bead core 5 beyond the rim flange 3f. The above-mentioned turned up portion 6b extends radially outwardly along the axially outside of the bead apex 8, and the radial height ha of the turned up portion 5b from the bead base line BL is more than the radial height hb of the bead apex 8 from the bead base line BL. In the radial height range between ha and hb, the turned up portion 6b abuts on the main portion 6a. The turned up portion 6b is terminated on the radially inside of the maximum section width position of the carcass 6.

The tread reinforcing belt comprises a breaker 7 and optionally a band 9.

The breaker 7 is composed of at least two cross plies, a radially inner ply 7A and a radially outer ply 7B, each made of rubberized parallel steel cords laid at an angle of 10 to 30 degrees with respect to the tire equator C.

In this embodiment, the breaker 7 consists of the two cross plies 7A and 7B.

The band 9 is disposed on the radially outside of the breaker 7 so as to cover at least the edge portions of the breaker 7, and made of one or more organic fiber cords laid at almost zero angle or a small angle of less than 5 degrees with respect to the circumferential direction of the tire. As to the materials of the organic fiber cords, nylon, polyethylene-2,6-naphtarete (PEN) and aramid are preferably used.

In this embodiment, the band 9 composed of a full-width ply 9A having a width substantially equal to the breaker 7 is provided in order to reduce the road noise as well as to prevent the tread portion from lifting during high-speed running.

It is however, also possible that the band is a pair of axially spaced edge plies each covering at least an edge portion of the breaker 7 having 10% width from each of the axial edges. Furthermore, the band may be a combination of the full-width ply and edge plies still furthermore, as one of the full width plies, a band ply, which consists of a central part made up of a low modulus cord such as nylon, and a pair of edge parts made up of high modulus cords such as aramid and PEN, can be used. The width of each edge part may have 10% or more of the breaker 7, and accordingly, the width of the central part is 80% or less.

In the tread portion 2t, a tread rubber 10 is disposed radially outside the belt. In order to reduce road noise, at least a ground-contacting surface of the tread portion is made of a rubber compound having a hardness of not less than 58 degrees, preferably more 60 degrees, but not more than 70 degrees, preferably less than 67 degrees.

Figure 4:
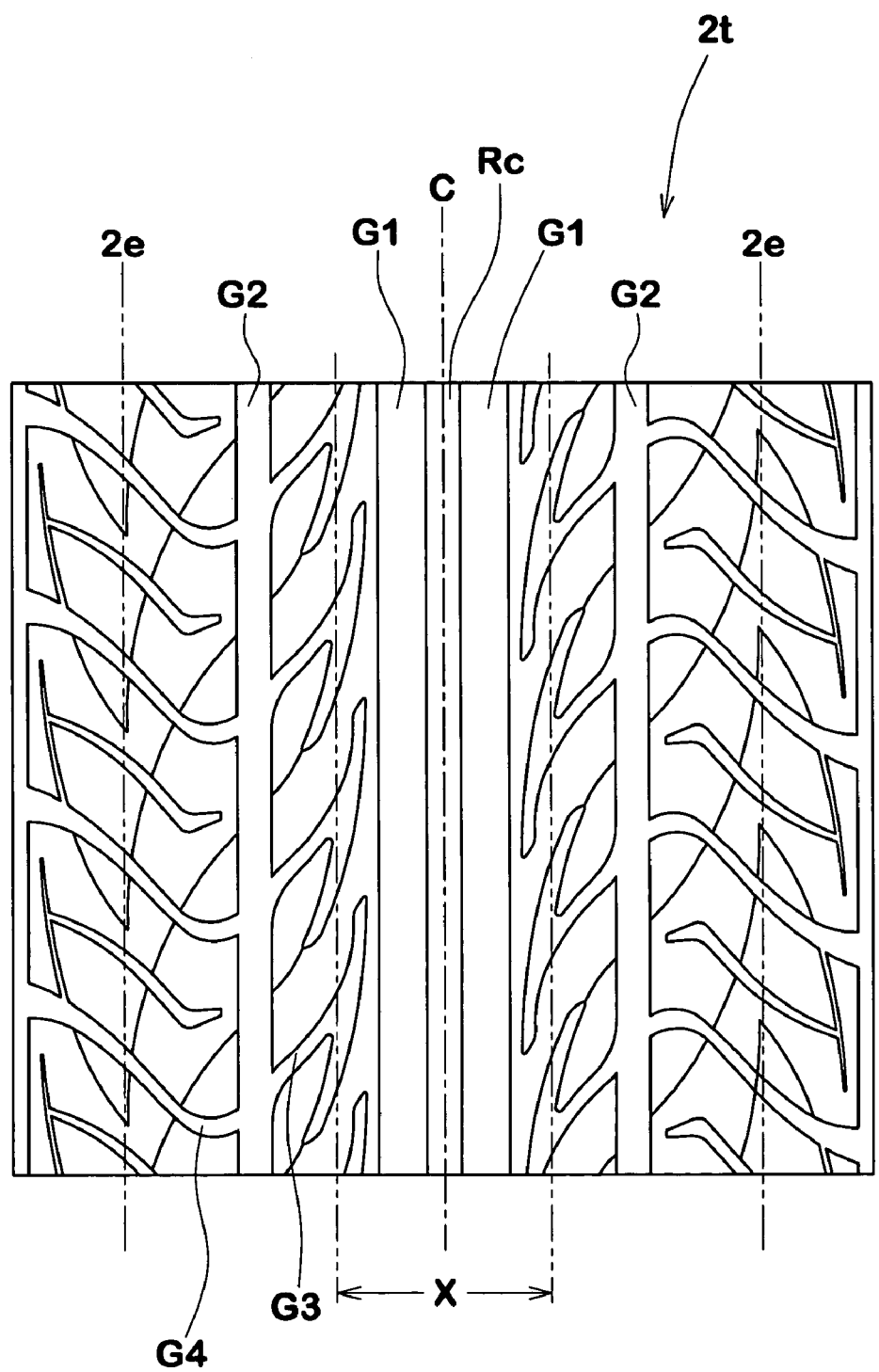
FIG. 4 is a partial view of the tread portion showing a tread pattern.
Figure 5:
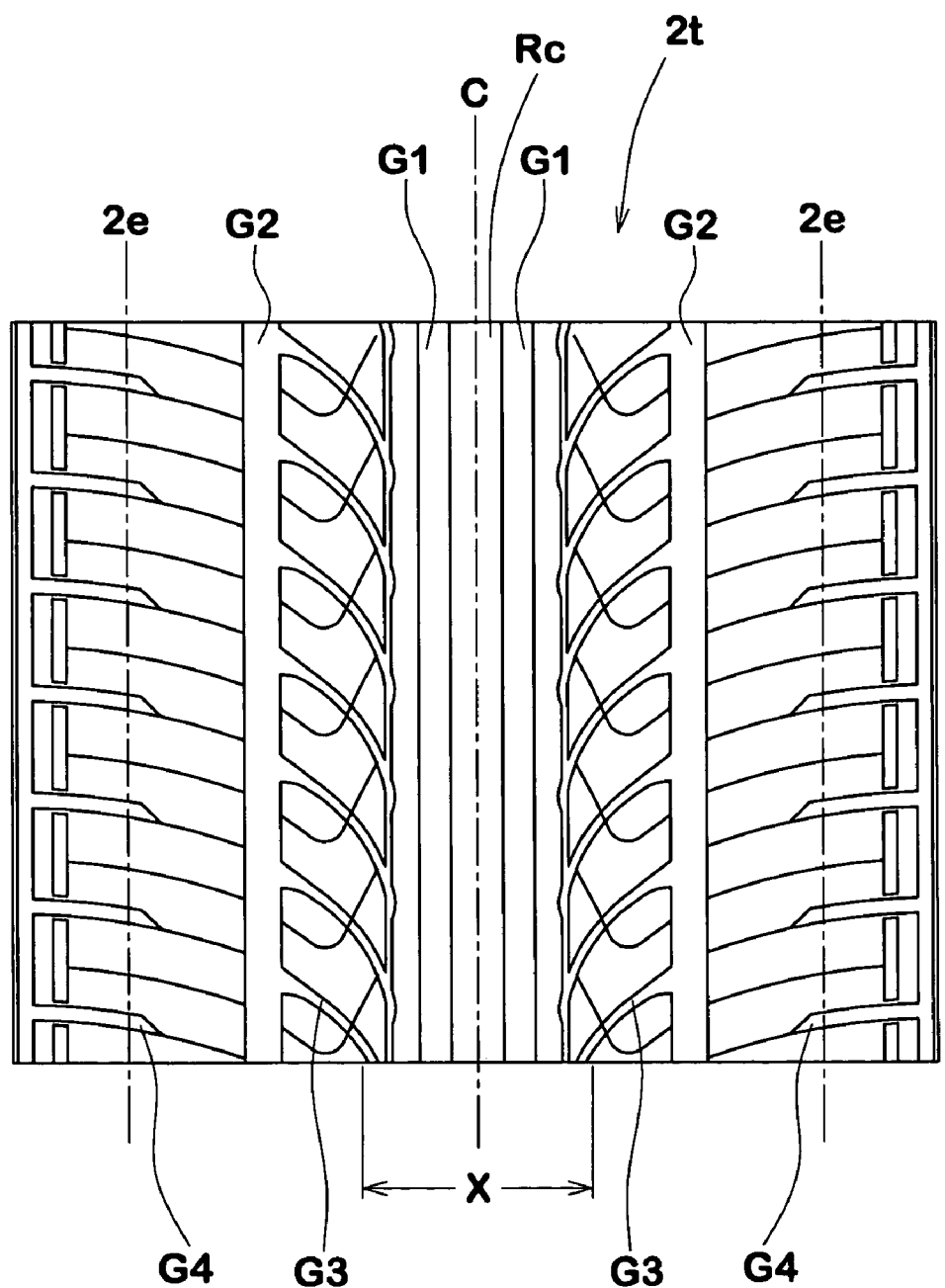
FIG. 5 is a similar view showing another example of the tread pattern.

FIG. 4 and FIG. 5 each show a tread pattern usable in this invention. AS shown in these figures, the tread portion 2t is provided in the ground contacting region with tread grooves defining the tread pattern having a sea ratio in the range of not less than 20%, preferably not less than 23%, more preferably not less than 27%, but not more than 37%, preferably not more than 35%. If the sea ratio exceeds 37%, it becomes difficult to reduce so called pattern pitch noise. If the sea ratio becomes less than 20%, it is difficult to provide necessary drainage and wet performance. By setting the sea ratio as above, the pattern pitch noise can be reduced. Thus, by disposing the noise damper 5 in such tire, the road noise and pattern pitch noise are reduced. Especially, noise whose maximum power spectrum lies around 1 kHz is significantly reduced.

In the examples shown in FIG. 4 and FIG. 5, the tread grooves include circumferential grooves G1 and G2 and oblique grooves G3 and G4 disposed on each side of the tire equator C.

The circumferential grooves G1 and G2 are a relatively wide groove having a groove width of not less than 6.0 mm, and in the illustrated examples, these grooves extend straight in the tire circumferential direction. As a result, a straight rib R1 is formed on the tire equator c. The width of the rib is almost same as the width of the axially inner circumferential groove G1. From the axially outer circumferential grooves G2, the oblique grooves G3 extend axially inwards and terminate before the axially inner circumferential grooves G1. Therefore, a circumferentially continuously extending part is formed immediately axially outside the axially inner groove G1. There is no groove connected to the axially inner groove G1.

The grooves G4 are disposed between outer grooves G2 and tread edges 2e to extend to the tread edges 2e.

The above-mentioned noise damper 5 has a specific gravity in the range of not less than 0.005, preferably more than 0.010, more preferably more than 0.01, but not more than 0.06, preferably less than 0.03, more preferably less than 0.02.

In this embodiment, a spongy material, specifically polyurethane foam, an open porous material is used.

The volume of the noise damper 5 is set in a range of not less than 0.4%, preferably more than 1%, more preferably more than 2%, still more preferably more than 4%, but not more than 20%, preferably less than 10% of the volume V1 of the tire cavity 4.

If the specific gravity is less than 0.005 or more than 0.06, it becomes difficult to control the air resonance in the cavity 4. By setting the damper volume over 0.4%, a noise reduction of about 2 dB may be expected. If the damper volume is more than 20%, although the noise reduction already reaches the ceiling, the weight and cost increase and the rotational balance is liable to deteriorate.

The noise damper 5 is fixed to the cavity's surface 4s. As explained above, the cavity's surface 4S includes the tire inner surface 4s1 and the wheel rim inner surface 4s2. This is meant for the noise damper 5 fixed to the wheel rim. In this embodiment, contrary, the noise damper 5 is bonded to the tire inner surface 4s1 not only to reduce the tire cavity's air resonance but also for the following reasons.

Figure 2:
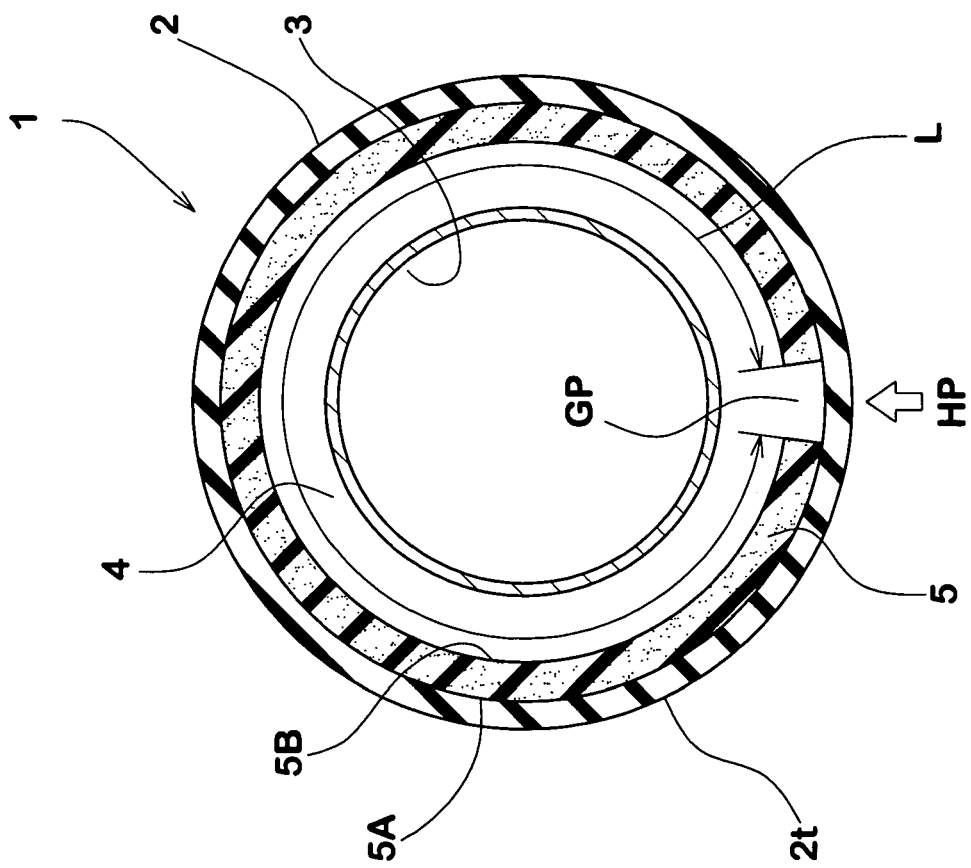
FIG. 2 is a schematic cross sectional view thereof taken along the tire equator.

As shown in FIG. 2, the noise damper 5 is a strip of the porous material (not an annular body) having a length L equal to or shorter than the inner circumference of the tire.

AS well known in the tire art, a pneumatic tire has a heavy point HP about the tire rotational axis. This point is marked on the tire inner surface 4s1. In this embodiment, the noise damper is also utilized to compensate this weight imbalance. As show in FIG. 2, a gap GP is formed between the ends of the strip 5, and the gap GP is centered on the heavy point HP. Ideally speaking, the weight of the strip whose size corresponding to the gap has to correspond to the imbalance weight. The gap is so determined. But, if the imbalance weight is decreased, not to say completely balanced or become zero, it is good enough usually it may be several centimeters at most although the gap varies depending on the shape and specific gravity of the strip. Thus, the length L of the strip is at most about 50 mm to about 100 mm shorter than the inner circumference.

The cross sectional shape of the noise damper 5 is substantially constant in the tire circumferential direction. In FIG. 1, the noise damper 5 is slightly tapered from the fixed base 5A to the free end 5B so as to have a substantially trapezoidal cross sectional shape in the meridian section of the tire.

The axial width x (maximum width) of the noise damper 5 is narrower than the width of the breaker 7. It is preferable that the ratio of the radial height (thickness) of the noise damper 5 to the axial width x is set in a range of not less than 0.5, more preferably not less than 1.0, but preferably not more than 3.0. Thus, by selecting values to satisfy this thickness/width ratio limitation and the above-mentioned volume limitation, the size of the strip can be determined. In view of the bonding strength and durability, however, it is preferable that the axial width x is more than about 3 cm, preferably more than 4 cm.

The noise damper 5 is centered on the tire equator c, and in this embodiment, the entire width of each of the axially inner circumferential grooves G1 is located within the width x of the base 5A of the noise damper 5 so that, beneath the groove bottom, the noise damper 5 certainly exists. The bottom of the wide central circumferential grooves G1 is liable to vibrate with relatively large amplitude during running, and the vibration easily transmits to the air in the cavity 4. By arranging the noise damper 5 as above, the transmission of vibrations from the tread portion to the air is hindered, and the vibrations of the tread portion is damped. Thus, the road noise can be effectively reduced.

Figure 6:
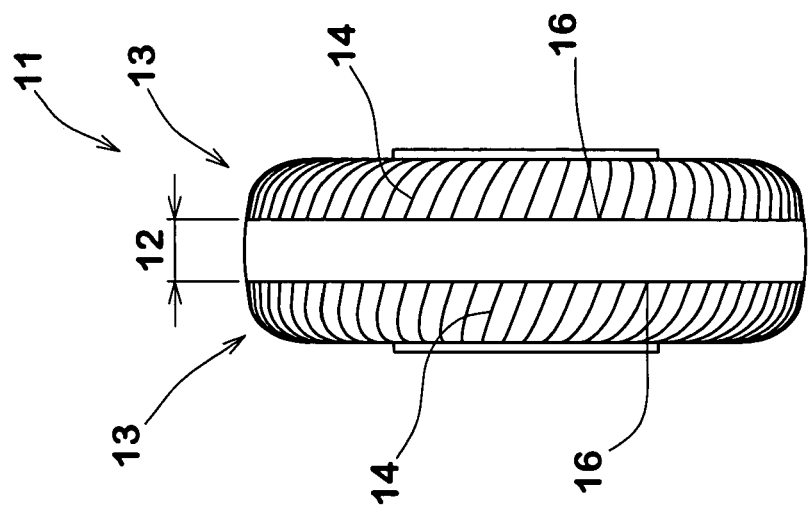
FIG. 6 is a schematic view of a tire curing bladder.

As to a method for fixing the noise damper 5 to the tire inner surface 4s1, in view of cost, stability, working efficiency and the like, the use of adhesive agent is preferred. Depending on the damper material, naturally a double-faced adhesive tape may be used too. In this case, the mold release agent such as silicon oil should be removed from the tire inner surface 4s1 before applying the adhesive agent to increase the bonding strength. Further, if small rib-like protrusions 15 are formed on the tire inner surface 4s1 due to vent grooves provided on the surface of the tire curing bladder, it is better to remove the protrusions from the bonding face in order to increase the bonding strength, for example by the use of a grinder or the like. In order to save such labor, in this embodiment, the tire 2 is vulcanized by the use of a bladder 11 as shown in FIG. 6. The bladder 11 is toroidal and provided with a smooth central zone 12 along the equator, but the lateral zone 13 on each side thereof is provided with a large number of vent grooves 14. The vent grooves 14 extend radially from the smooth central zone 12 to remove the air between the tire and bladder. The width of the smooth central zone 12 is slightly wider than the width x of the b a s e 5A of the noise damper 5. Thus, as shown in FIG. 1, the tire 2 is provided on the inside of the tread center with a smooth zone z onto which the noise damper 5 is bonded. In order to facilitate the positioning of the noise damper 5 and the application of the adhesive agent as well as the leading of the air trapped in the central zone to the radial vent grooves 14, it is possible to form a circumferential vent groove 16 along each of the edges of the annular smooth surface 12 so that the above-mentioned mentioned radially extending vent grooves 14 extends from the circumferential vent grooves 16, whereby a circumferentially extending protrusion or small rib 17 having a minimal height is formed along each of the edges of the annular smooth surface z.

After the mold release agents is removed from the bonding surface z, a primer for improving the bonding strength is preferably applied to the surface z and the damper's bonding surface prior to the application of the adhesive agent. For the tire inner surface 4s1, a primer containing synthetic rubber as a main component, and a solvent such as toluene, methyl ethyl ketone and dimethylformamide is preferably used. For the bonding surface of the noise damper 5, a primer containing synthetic rubber as a main component, and a solvent such as toluene, methyl ethyl ketone and acetic ether is be preferably used.

AS to the adhesive agent, synthetic-rubber adhesive agents such as: a liquid solution type in which a synthetic rubber is dissolved by an organic solvent; and a latex type in which a synthetic rubber is dispersed in an aqueous fluid (water) are preferably used. AS the organic solvent, alicyclic solvents such as cyclohexane, ketones such as acetone, aliphatic solvents such as hexane and the like can be preferably used alone or as a mixture from the viewpoint of solubility, workability, working environment and cost. AS to the synthetic rubber, on the other hand, chloroprene rubber is preferably used. Especially, a combination of chloroprene rubber and organic solvent is preferred for the flexibility and strong adhesive force. In this case, the percentage of the weight of the chloroprene rubber to the gross weigh of the adhesive agent is preferably set in the range of from 25 to 35%. If less than 25%, it becomes difficult to obtain a sufficient adhesive strength. If more than 35%, it becomes too thick to apply equally.

As explained above, the sea ratio is limited to in a specific range. It is preferable that the steel quantity of each of the breaker plies 7A and 7B is further limited to within a specific range of 5.5 to 9.2 sq.mm/5 cm. Here, the steel quantity is defined as the total cross sectional area in sq.mm of the steel cords in a breaker ply per 5 cm width of the ply perpendicular to the cord direction. If all the steel cords are the same cross sectional area, the steel quantity can be computed simply by multiplying the cross sectional area of one steel cord by the cord count per 5 cm.

By setting the steel quantity in this range, interior noise whose maximum power spectrum lies around 1 kHz and which may sound like "SHAH" can be reduced. The main cause for this type of noise is the resonance of air in a wide circumferential groove. By increasing the steel quantity as above, the vibration of the belt during running is reduced, and the vibrations transmitted to the groove and the air therein is also reduced. As a result, the "SHAH" noise is reduced.

Further, in case of the belt including the band, it is desirable to limit the modulus coefficient N/cm of the band ply within a range of from 8.0 to 41.5 in addition to the above limitations. Here, the modulus coefficient of a band ply is defined as the total of the products of the 2% modulus in N/sq.mm and sectional area in sq.mm of the respective band cords per 1 cm width of the ply, divided by 1000. If all the cords are the same, the modulus coefficient can be obtained as the product of the 2% modulus in N/sq.mm of a band cord and the sectional area in sq.mm of the band cord and the cord count per 1 cm width of the band ply, which product is divided by 1000.

By limiting the modulus coefficient as above, the resonance of the air in the cavity 4 can be reduced and the noise is reduced in a frequency range of about 250 to 315 HZ.

Comparison Tests

Various radial tires of size 195/65R15 91H for passenger cars were prepared, and noise tests were carried out, combining a standard wheel rim of size 15×6JJ and identical noise damper.

The noise damper was formed by bonding a strip to the inside of the tire tread region as shown in FIG. 2 using an adhesive agent.

The strip was made of ether based polyurethane sponge, and the specific gravity was 0.0016. The size was 7 cm in width, 4 cm in height and 185 cm in length, and the volume was 10% of the volume of the cavity.

Basic specifications of the tires are as follows.

<Carcass>
  Number of ply: 2
  Carcass ply turned up height ha: 75 mm (max.)
  Cord material: polyester
  Cord count/5 cm: 50

<Breaker>
  Number of ply: 2
  Cord material: steel
  Cord structure: 1×8
  Steel filament Dia.: 0.23mm
  Cord count/5 cm: 24
  Steel quantity: 7.98 sq.mm/5 cm <Band>
  Number of Full width ply: 1
  Cord material: nylon
  Sectional area of a cord: 0.248 sq.mm
  2% modulus of a cord: 3228 N/sq.mm
  Cord count: 10/cm
  Modulus coefficient: 8.0

<Tread Rubber>
  hardness: 67 degrees

<Bead Apex>
  hardness: 86 degrees
  Height hb: 40 mm

<Filler>

In the bead portions, there is no reinforcing layer or filler.

The actual test tires were changed from this basic structure as described below.

Feeling tests were conducted, using a Japanese 2000cc FF passenger car whose all the four wheel were provided with the test tires (pressure 200 kPa) and noise dampers. During running in a tire noise test course, noise was evaluated by the test driver on a scale on which 10 is the best.

The type of evaluated noise sound, road surface and running speed were as follows:

<Road noise>
  Road surface: Roughened bituminous road
  Running speed: 60 km/hr
  Evaluated sound:
  Passenger room's air resonance in a frequency range of about 80 to 100 Hz (hereinafter Room resonance);
  Sound in a frequency range of about 125 to 200 Hz which sounds like "GHO" (hereinafter "GHO" sound);
  Tire cavity's air resonance in a range of about 220 to 240 Hz (hereinafter cavity resonance); and
  Sound in a frequency range of about 250 to 315 Hz which sounds like "GHA" (hereinafter "GHA" sound).

<Low-Speed Pattern Noise>
  Road surface: smooth bituminous road
  Running speed: 60 km/hr
  Evaluated sound:
  Sound in a frequency range of more than about 200 Hz (hereinafter Pattern pitch sound)

<High-Speed Pattern Noise>
  Road surface: smooth bituminous road
  Running speed: 80 km/hr
  Evaluated sound:
  Sound in a frequency rage of more than about 1 kHz (hereinafter "SHAH" sound)

The test results are shown in Table 1-Table 7

TABLE 1

| Tire | Ref. 1 | Ref. 2 | Ex. 1 | Ex. 2 | Ex. 3 | Ex. 4 | Ex. 5 | Ex. 6 |
|---|---|---|---|---|---|---|---|---|
| Sea ratio (%) | | | | | | | | |
| Overall | 42 | 42 | 35 | 29 | 31 | 26 | 31 | 23 |
| Circum. grooves | 27 | 27 | 25 | 23 | 25 | 20 | 23 | 20 |

TABLE 1-continued

| Tire | Ref. 1 | Ref. 2 | Ex. 1 | Ex. 2 | Ex. 3 | Ex. 4 | Ex. 5 | Ex. 6 |
|---|---|---|---|---|---|---|---|---|
| Oblique grooves | 15 | 15 | 10 | 6 | 6 | 6 | 8 | 3 |
| Tread pattern | FIG. 4 | FIG. 4 | FIG. 4 | FIG. 5 | FIG. 5 | FIG. 5 | FIG. 5 | FIG. 5 |
| Noise damper | non | provided | provided | provided | provided | provided | provided | provided |
| Feeling tests | | | | | | | | |
| Room resonance (80-100 Hz) | 6 | 6 | 6 | 6 | 6 | 6 | 6 | 6 |
| "GHO" sound (125-200 Hz) | 6 | 5.5 | 5.5 | 5.5 | 5.5 | 5.5 | 5.5 | 5.5 |
| Cavity resonance (220-315 Hz) | 5 | 8 | 8 | 8 | 8 | 8 | 8 | 8 |
| "GHA" sound (250-315 Hz) | 6 | 5 | 5.5 | 5.5 | 5.5 | 5.5 | 5.5 | 5.5 |
| Pattern pitch sound (over 200 Hz) | 5 | 4 | 6 | 7.5 | 7.5 | 7.5 | 7 | 8 |
| "SHAH" sound (over 1 kHz) | 5 | 4 | 6 | 6.5 | 6 | 7 | 6.5 | 7 |
| Average | 5.5 | 5.4 | 6.2 | 6.5 | 6.4 | 6.6 | 6.4 | 6.7 |

Firstly, Table 1 shows test results where the sea ratio was varied.

Ref.2 differed from Ref.1 in that the noise damper was provided. Thus, when compared with Ref.1, Ref.2 was greatly reduced in the cavity resonance sound. As a result, other type of noise such as road noise ("GHO" sound, GHA sound), pattern noise (Pattern pitch sound, "SHAH" sound) became worse on the whole, and the comprehensive evaluation came down.

Ex.1 differed from Ref.2 in that the sea ratio was decreased to 35% by decreasing the widths of the circumferential grooves and oblique grooves down to 7.4% and 33.3%, respectively. As a result, the Pattern pitch sound and "SHAH" sound were reduced to an ignorable level and the comprehensive evaluation come up.

Ex.2 was further decreased in the sea ratio down to 29% by changing the tread pattern from FIG. 4 to FIG. 5. As a result, the Pattern pitch sound and "SHAH" sound decreased and the comprehensive evaluation came up to 6.5.

Ex.2 to Ex.6 had similar tread patterns based on the FIG. 5 pattern, wherein the grooved area of the oblique grooves and the grooved area of the circumferential grooves were changed independently. As a result, it was confirmed that the oblique grooves more affect the Pattern pitch sound while the circumferential grooves more affect the "SHAH" sound, and the comprehensive evaluation can be improve by setting the sea ratio in the range of 20 to 35%. In particular, when the grooved area (sea ratio) of the oblique grooves was 3 to 10%, and the grooved area (sea ratio) of the circumferential grooves was 20 to 26%, good results could be obtained.

TABLE 2

| Tire | Ex. 7 | Ex. 2 | Ex. 8 | Ex. 9 |
|---|---|---|---|---|
| Sea ratio (%) | 29 | 29 | 29 | 29 |
| Tread rubber hardness (deg) | 70 | 67 | 64 | 58 |
| Feeling tests | | | | |
| Room resonance (80-100 Hz) | 6 | 6 | 6 | 6 |
| "GHO" sound (125-200 Hz) | 5 | 5.5 | 6 | 6.5 |
| Cavity resonance (220-315 Hz) | 8 | 8 | 8 | 8 |
| "GHA" sound (250-315 Hz) | 5 | 5.5 | 6 | 7 |
| Pattern pitch sound (over 200 Hz) | 7 | 7.5 | 7.5 | 8 |
| "SHAH" sound (over 1 kHz) | 6 | 6.5 | 7 | 7.5 |
| Average | 6.2 | 6.5 | 6.8 | 7.2 |

Table 2 shows the results wherein the hardness of the tread rubber was changed on the basis of Ex.2.

From these results, it was confirmed that the pattern noise and road noise reduces as the hardness of the tread rubber decreases. However, if the tread rubber is too soft, it is very difficult to maintain the wear resistance suitable for practical use. In this light, it is preferred the hardness is 58 to 70 degrees.

TABLE 3

| | Ex. 10 | Ex. 2 | Ex. 11 | Ex. 12 |
|---|---|---|---|---|
| Sea ratio (%) | 29 | 29 | 29 | 29 |
| Breaker | | | | |
| Steel quantity (sq. mm/5 cm) | 5.54 | 7.98 | 6.87 | 9.16 |
| Steel cord structure | 1 × 1 | 1 × 8 | 1 × 3 | 1 × 4 |
| Filament dia. (mm) | 0.42 | 0.23 | 0.27 | 0.27 |
| Cord count/5 cm | 40 | 24 | 40 | 40 |
| Feeling tests | | | | |
| Room resonance (80-100 Hz) | 6 | 6 | 6 | 6 |
| "GHO" sound (125-200 Hz) | 5.5 | 5.5 | 5.5 | 5.5 |
| Cavity resonance (220-315 Hz) | 8 | 8 | 8 | 8 |
| "GHA" sound (250-315 Hz) | 5.5 | 5.5 | 5.5 | 5.5 |
| Pattern pitch sound (over 200 Hz) | 7.5 | 7.5 | 7.5 | 7.5 |
| "SHAH" sound (over 1 kHz) | 5.5 | 6.5 | 6 | 7 |
| Average | 6.3 | 6.5 | 6.4 | 6.6 |

Further, on the basis of Ex.2, changing the steel quantity, noise performance was compared. The results are shown in Table 3.

It was confirmed that as the steel quantity increased, the pattern noise, in particular "SHAH" sound of about 1 kHz or more was reduced.

As shown in Ex.10, even if the steel quantity was decreased to as low as 5.5 sq.mm/5 cm, the comprehensive evaluation could be improved to 6.3. contrary, if the steel quantity is too high, drawbacks such as deterioration in ride comfort and undesirable weight increase are caused.

Thus, it is preferable that the steel quantity is set to be at most 9.2 sq.mm/5 cm.

TABLE 4

| Tire | Ex. 2 | Ex. 13 | Ex. 14 | Ex. 15 | Ex. 16 |
|---|---|---|---|---|---|
| BAND | | | | | |
| Number of Full width ply | 1 | 1 | 1 | 1 | 1 |
| Cord material | nylon | nylon + aramid | PEN | PEN | nylon(center) + PEN (edge portion) |
| Sectional area of a cord (sq.mm) | 0.248 | 0.283 | 0.247 | 0.37 | 0.247(PEN) |
| 2% modulus of a cord (N/sq.mm) | 3228 | 2898 | 11235 | 11235 | 11235(PEN) |
| Cord count/cm | 10 | 10 | 10 | 10 | 10 |
| Modulus coefficient | 8 | 8.2 | 27.7 | 41.5 | 27.7(edge) |
| Feeling tests | | | | | |
| Room resonance (80-100 Hz) | 6 | 6 | 6 | 6 | 6 |
| "GHO" sound (125-200 Hz) | 5.5 | 6.5 | 7 | 7.5 | 7 |
| Cavity resonance (220-315 Hz) | 8 | 8 | 8 | 8 | 8 |
| "GHA" sound (250-315 Hz) | 5.5 | 7 | 7.5 | 8 | 7.5 |
| Pattern pitch sound (over 200 Hz) | 7.5 | 7.5 | 7.5 | 7.5 | 7.5 |
| "SHAH" sound (over 1 kHz) | 6.5 | 5.5 | 5.5 | 5 | 6.5 |
| Average | 6.5 | 6.8 | 6.9 | 7 | 7.1 |

Furthermore, Table 4 shows the results wherein on the basis of Ex.2, changing the modulus coefficient of the band ply, noise performance was compared.

From the test results, it was confirmed that the road noise, in particular "GHO" or "GHA" sound can be effectively reduced by increasing the modulus coefficient.

However, an excessive increase of the modulus coefficient has a tendency to increase the "SHAH" sound around 1 kHz. Further it becomes difficult that the band makes a sufficient stretch during manufacturing tire.

Therefore, in order to meets theses requirements, the modulus coefficient is preferably limited to in the range of 8.0 to 42.0.

TABLE 5

| Tire | Ex. 17 | Ex. 18 | Ex. 2 | Ex. 19 |
|---|---|---|---|---|
| Bead apex hardness (deg) | 98 | 92 | 86 | 80 |
| Feeling tests | | | | |
| Room resonance (80-100 Hz) | 5 | 5.5 | 6 | 7 |

TABLE 5-continued

| Tire | Ex. 17 | Ex. 18 | Ex. 2 | Ex. 19 |
|---|---|---|---|---|
| "GHO" sound (125-200 Hz) | 4.5 | 5 | 5.5 | 7 |
| Cavity resonance (220-315 Hz) | 8 | 8 | 8 | 8 |
| "GHA" sound (250-315 Hz) | 5.5 | 5.5 | 5.5 | 5.5 |
| Pattern pitch sound (over 200 Hz) | 7.5 | 7.5 | 7.5 | 7.5 |
| "SHAH" sound (over 1 kHz) | 6.5 | 6.5 | 6.5 | 6.5 |
| Average | 6.2 | 6.3 | 6.5 | 6.9 |

Table 5 shows the results wherein, on the basis of Ex.2, the hardness of the bead apex was changed.

From the test results, it was confirmed that, as the hardness decreases, the road noise, in particular, room resonance sound, "GHO" sound and cavity resonance sound can be effect reduced. However, if the bead apex is too soft, the steering stability is liable to deteriorate. In this light, therefore, the hardness of the bead apex is preferably set in the range of 80 to 98 degrees,

TABLE 6

| Tire | Ex. 2 | Ex. 20 | Ex. 21 | Ex. 22 | Ex. 23 | Ex. 24 |
|---|---|---|---|---|---|---|
| Carcass | | | | | | |
| Number of ply | 2 | 1 | 1 | 1 | 1 | 1 |
| Turned up height (mm) | 75(max.) | 75 | 30 | 30 | 30 | 30 |
| BEAD | | | | | | |
| Bead apex hardness (deg) | 86 | 86 | 86 | 92 | 92 | 92 |
| Bead apex height (mm) | 40 | 40 | 40 | 25 | 25 | 25 |
| Rubber filler | — | — | — | — | hardness 92 deg. | — |
| Cord filler | — | — | — | — | — | Steel cords |
| Filler height (mm) | — | — | — | — | 50 | 50 |
| Feeling tests | | | | | | |
| Room resonance (80-100 Hz) | 6 | 6.5 | 7 | 8 | 7.5 | 7.5 |
| "GHO" sound (125-200 Hz) | 5.5 | 6.5 | 7 | 7 | 7 | 7 |
| Cavity resonance (220-315 Hz) | 8 | 8 | 8 | 8 | 8 | 8 |
| "GHA" sound (250-315 Hz) | 5.5 | 5.5 | 5.5 | 5.5 | 5.5 | 5.5 |
| Pattern pitch sound (over 200 Hz) | 7.5 | 7.5 | 7.5 | 7.5 | 7.5 | 7.5 |
| "SHAH" sound (over 1 kHz) | 6.5 | 6.5 | 6.5 | 6.5 | 6.5 | 6.5 |
| Average | 6.5 | 6.8 | 6.9 | 7.1 | 7 | 7 |

Still furthermore, noise performance was compared, changing construction such as carcass structure and the like on the basis of Ex.2. The results are shown in Table 6.

The comparison between Ex.2 and Ex.20 shows that the use of a single ply carcass can effectively reduce a particular noise, namely, the passenger room resonance sound and "GHO" sound. Further, the comparison between Exs.21 and 22 and Ex.20, wherein the carcass ply turned up height was decreased from Ex.20 shows that, in addition to the room resonance sound, the "GHO" sound of about 125 to 200 Hz can be also reduced.

The comparison between Ex.21 and Ex.22 shows that the noise can be more reduced by increasing the hardness and decreasing the height of the bead apex.

TABLE 7

| Tire | Ex. 25 |
|---|---|
| Sea ratio(%) | 23 |
| Tread rubber hardness (deg) | 58 |
| Band ply modulus coefficient | 27.7 |
| Breaker ply steel quantity (sq. mm/5 cm) | 9.16 |
| Carcass ply number | 1 |
| Carcass ply turned up height (mm) | 30 |
| Bead apex hardness (deg) | 92 |
| Bead apex height (mm) | 25 |
| Rubber filler hardness (deg) | 92 |
| Rubber filler height (mm) | 50 |
| Feeling tests | |
| Room resonance (80-100 Hz) | 8 |
| "GHO" sound (125-200 Hz) | 8 |
| Cavity resonance (220-315 Hz) | 8 |
| "GHA" sound (250-315 Hz) | 8 |
| Pattern pitch sound (over 200 Hz) | 8 |
| "SHAH" sound (over 1 kHz) | 8 |
| Average | 8 |

Table 7 shows the results of Ex.25 which is one of most effective combinations of the above-explained parameters.

Frequency Analysis

In addition to the above feeling tests, using a FFT analyzer, the power spectrum and overall sound level of the noise measured near the driver's ears during running on the roughened bituminous road at 60 km/h were measured.

Figure 7:
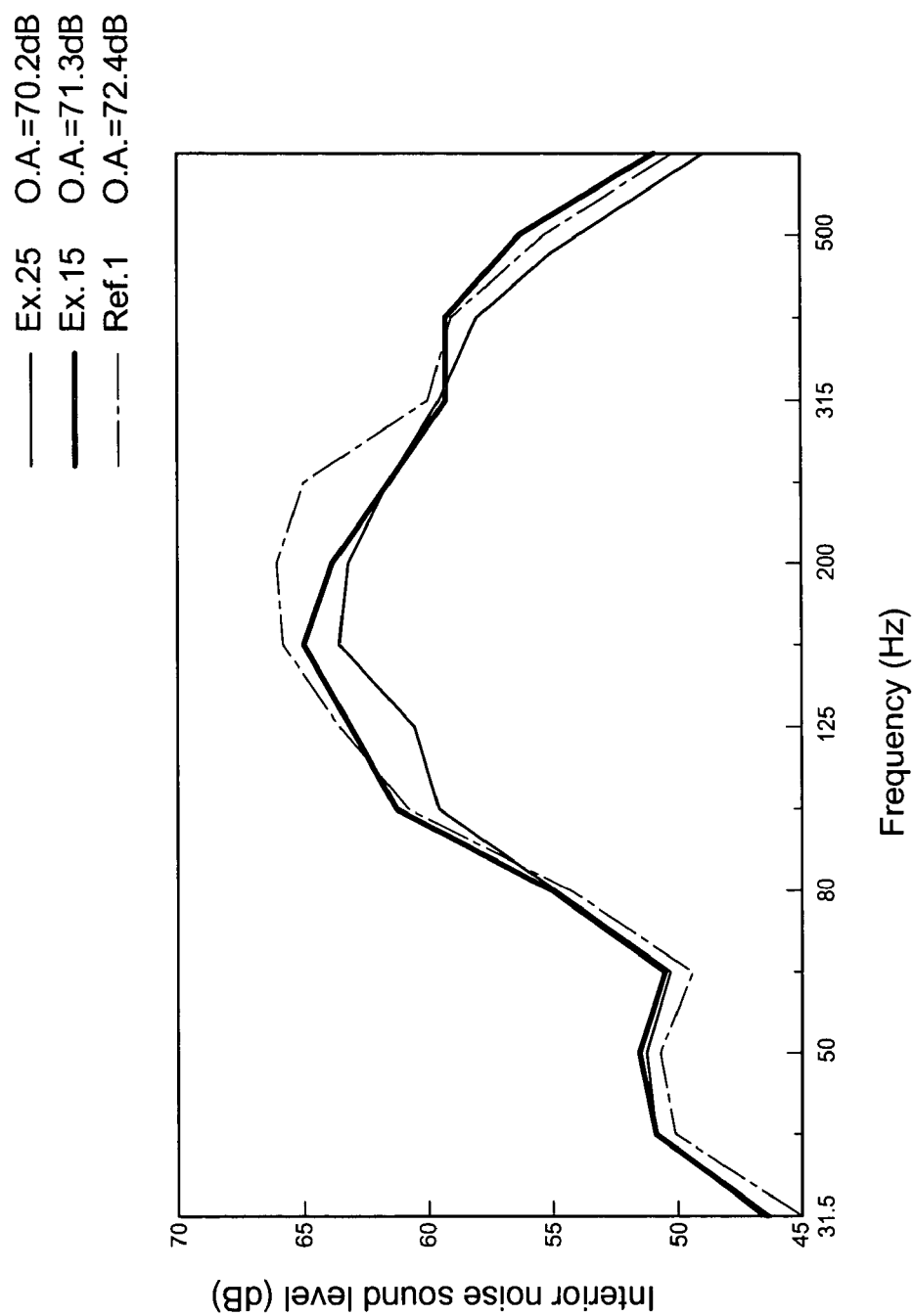
FIG. 7 is a graph showing a power spectrum of interior noise sound.

The results of typical examples Ex.25, Ex.15 and Ref.1 are shown in FIG. 7.

The noise level of Ref.1 is relatively low under 80 HZ. But, over 80 HZ the relation is reversed, and the noise level of Ex.15 and Ex.26 is considerably reduced in a significant frequency range. As apparent from the comparison between Ex.15 and Ex.25, the noise level of Ex.25 is reduced more than a little in a frequency range of about 100 to 250 HZ.

Figure 8:
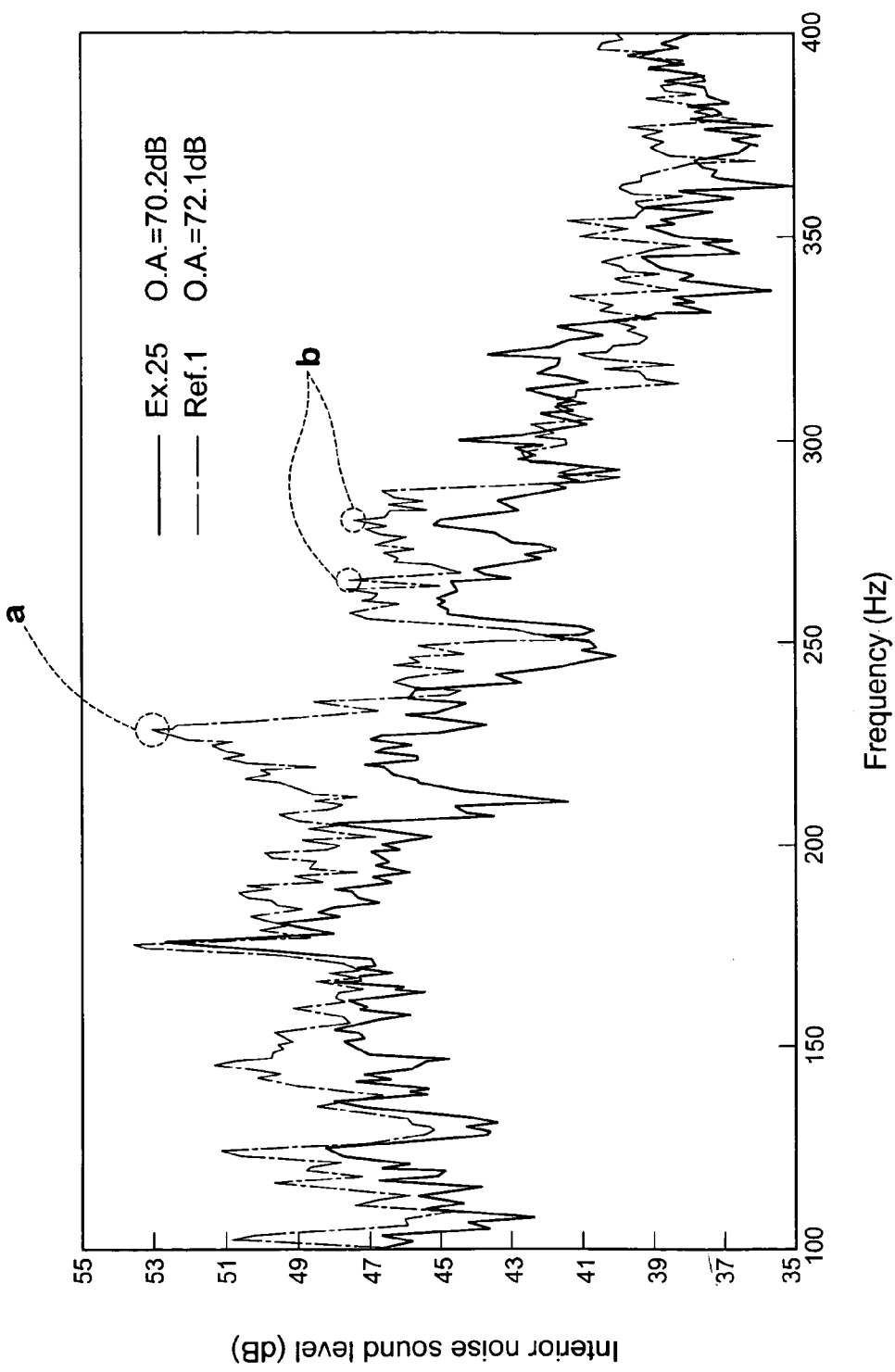
FIG. 8 is a graph showing a high-resolution power spectrum of the interior noise sound.

FIG. 8 also shows the power spectrum in high resolution mode in a range of 100 to 400 HZ. The noise level of Ex.25 was reduced in the entire frequency range, and especially, peaks (a) and (b) appearing in Ref.1 due to the cavity resonance were effectively damped.

The invention claimed is:

1. A tire noise reducing system comprising
a pneumatic tire with a hollow,
a wheel rim on which the tire is mounted so that said hollow forms a closed cavity, and
a noise damper disposed in the closed cavity, wherein
the noise damper is formed by fixing a strip of a porous material to the inner surface of the tire,
the noise damper has a volume in a range of from 0.4 to 20% of the volume of the cavity,
the noise damper has a sectional shape substantially constant in the tire circumferential direction, and
the pneumatic tire comprises a tread portion provided with tread grooves defining a tread pattern having a sea ratio of 20 to 35%, wherein
said inner surface of the tire is provided with an annular smooth zone extending along the tire equator, and lateral zones in which small rib-like protrusions extending radially from the annular smooth zone are formed,
said strip is fixed to the annular smooth zone, and wherein
the axial width of the annular smooth zone is slightly wider than the axial width of the base of the strip fixed thereto.

2. A tire noise reducing system comprising
a pneumatic tire with a hollow,
a wheel rim on which the tire is mounted so that said hollow forms a closed cavity, and
a noise damper disposed in the closed cavity,
said pneumatic tire comprising
a tread portion,
a pair of sidewall portions,
a pair of axially spaced bead portions,
a carcass extending between the bead portions through the tread portion and sidewall portions,
a belt comprising a breaker and a band, the belt being disposed radially outside the carcass in the tread portion, and
a tread rubber disposed radially outside the belt, and wherein
the noise damper is formed by fixing a strip of a porous material to the inner surface of the tire,
the noise damper has a volume in a range of from 0.4 to 20% of the volume of the cavity,
the noise damper has a sectional shape substantially constant in the tire circumferential direction, and
the tread portion is provided with tread grooves defining a tread pattern having a sea ratio of 20 to 35%,
the tread rubber has a JIS-A hardness of from 58 to 70 degrees,
the breaker is disposed radially outside the carcass and comprises at least two cross plies of steel cords, each said ply having a steel quantity in a range of from 5.5 to 9.2 sq.mm, wherein the steel quantity is the total sectional area in sq.mm of the steel cords per 5 cm width of the ply,
the band comprises a full-width ply made of at least one organic fiber cord wound around the breaker, the band having a modulus coefficient in a range of from 8.0 to 41.5, wherein the modulus coefficient is the total of the products of the sectional area in sq.mm and the 2% modulus in N/sq.mm of the respective band cords per 1 cm width, divided by 1000,
the inner surface of the tire is provided with an annular smooth zone extending along the tire equator, and lateral zones in which small rib-like protrusions extending radially from the annular smooth zone are formed,
the strip is fixed to the annular smooth zone, and wherein
the axial width of the annular smooth zone is slightly wider than the axial width of the base of the strip fixed thereto.

3. The tire noise reducing system according to claim 2 wherein the pneumatic tire comprises:
- a beads core disposed in each of the bead portions; and
- a bead apex rubber having a hardness of from 80 to 98 degrees disposed in each bead portion.

4. The tire noise reducing system according to claim 2 wherein said noise damper is fixed to the inner surface of the tread portion.

5. The tire noise reducing system according to claim 2 wherein said noise damper is fixed to the inner surface of the tread portion and made of a spongy material having a specific gravity in a range of more than 0.01, but not more than 0.06.

6. The tire noise reducing system according to claim 2 wherein said noise damper is fixed to an annular smooth zone provided in the inner surface of the tread portion along the tire equator.

\* \* \* \* \*